United States Patent
Sagi et al.

(10) Patent No.: US 11,656,350 B2
(45) Date of Patent: May 23, 2023

(54) RADAR PROXIMITY DETECTION WITH FLEXIBLE FOV

(71) Applicant: QUALCOMM Incorporated, San Diego, CA (US)

(72) Inventors: Ariel Sagi, Haifa (IL); Evyatar Hemo, Kiryat Bialik (IL); Evgeny Levitan, Haifa (IL); Gal Basson, Haifa (IL); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 16/880,148

(22) Filed: May 21, 2020

(65) Prior Publication Data
US 2022/0350010 A1 Nov. 3, 2022

Related U.S. Application Data

(60) Provisional application No. 62/932,176, filed on Nov. 7, 2019, provisional application No. 62/858,597, filed on Jun. 7, 2019.

(51) Int. Cl.
| G01S 13/87 | (2006.01) |
|---|---|
| G01S 13/04 | (2006.01) |
| G01S 13/56 | (2006.01) |
| G01S 13/88 | (2006.01) |
| G01S 13/06 | (2006.01) |
| G01S 13/58 | (2006.01) |

(52) U.S. Cl.
CPC ............. *G01S 13/87* (2013.01); *G01S 13/04* (2013.01); *G01S 13/06* (2013.01); *G01S 13/56* (2013.01); *G01S 13/58* (2013.01); *G01S 13/88* (2013.01)

(58) Field of Classification Search
CPC ........ G01S 13/887; G01S 13/04; G01S 13/56; G01S 13/88
See application file for complete search history.

(56) References Cited

U.S. PATENT DOCUMENTS

| 8,611,401 | B2* | 12/2013 | Lakkis | H04B 1/525 |
|---|---|---|---|---|
| | | | | 375/351 |
| 2010/0039311 | A1* | 2/2010 | Woodington | G01S 13/44 |
| | | | | 327/1 |
| 2016/0041258 | A1* | 2/2016 | Cashler | G01S 7/521 |
| | | | | 342/70 |
| 2016/0047892 | A1* | 2/2016 | Franceschini | G01S 13/003 |
| | | | | 342/60 |

* cited by examiner

*Primary Examiner* — Bernarr E Gregory
(74) *Attorney, Agent, or Firm* — Qualcomm Incorporated

(57) ABSTRACT

Power saving techniques for radar-based proximity sensing can include conducting proximity scans with a radar system in an omnidirectional proximity sensing mode in which signals are transmitted without directionality. Once an object is detected within a threshold proximity, the radar system can then switch to a directional proximity sensing mode to provide accurate directional detection capabilities in a desired field of view (FOV).

27 Claims, 9 Drawing Sheets

RADAR PROXIMITY DETECTION WITH FLEXIBLE FOV

RELATED APPLICATIONS

This application claims the benefit of U.S. Provisional Application No. 62/858,597, filed Jun. 7, 2019, entitled "RADAR PROXIMITY DETECTION WITH FLEXIBLE FOV," and claims the benefit of U.S. Provisional Application No. 62/932,176, filed Nov. 7, 2019, entitled "RADAR PROXIMITY DETECTION WITH FLEXIBLE FOV," both of which are assigned to the assignee hereof, and incorporated by reference herein in their entirety.

BACKGROUND

Proximity sensing involves detecting objects at small distances from an electronic device. Radar-based proximity detection can use radio frequency (RF) signals to perform the proximity sensing. Although radar-based proximity detection can offer advantages over proximity sensing using other technologies, it is not without drawbacks. Traditional implementations of radar-based proximity detection can use a relatively large amount of power, which may be beyond the power budget of certain applications.

SUMMARY

Power-saving techniques for radar-based proximity sensing can include conducting proximity scans with a radar system in an omnidirectional proximity-sensing mode in which signals are transmitted without directionality. Once an object is detected within a threshold proximity, the radar system can then switch to a directional proximity-sensing mode to provide accurate directional detection capabilities in a desired field of view (FOV).

An example method of operating a radar system to perform radar proximity detection, according to this disclosure, comprises, in an omnidirectional proximity sensing mode: transmitting, with a transmitter of the radar system, a first set of radio frequency (RF) pulses, the first set of RF pulses comprising one or more pulses, receiving, with a receiver of the radar system, at least one first reflected pulse, determining, with a processing unit, an object's presence within a threshold distance of the radar system, based on the receiving the at least one first reflected pulse, and in response to determining the object's presence, operating in a directional proximity sensing mode. The method further comprises, in the directional proximity sensing mode: transmitting, with a transmitter antenna array of the transmitter, a second set of RF pulses, the second set of RF pulses comprising a plurality of pulses, receiving, with a receiver antenna array of the receiver, at least one second reflected pulse, the at least one second reflected pulse comprising at least one RF pulse from the second set of RF pulses reflected off of the object, and determining, based on the transmitting of the second set of RF pulses and the receiving of the at least one second reflected pulse a proximity of the object, and whether the object is within a predetermined field of view (FOV).

An example device for performing radar proximity detection, according to this disclosure, comprises a memory and one or more processing units communicatively coupled with the memory and configured to, in an omnidirectional proximity sensing mode: transmit, with a transmitter of a radar system, a first set of radio frequency (RF) pulses, the first set of RF pulses comprising one or more pulses, receive, with a receiver of the radar system, at least one first reflected pulse, determine an object's presence within a threshold distance of the radar system, based on the receiving the at least one first reflected pulse, and in response to determining the object's presence, operate in a directional proximity sensing mode. The one or more processing units are further configured to, in the directional proximity sensing mode, transmit, with a transmitter antenna array of the transmitter, a second set of RF pulses, the second set of RF pulses comprising a plurality of pulses, receive, with a receiver antenna array of the receiver, at least one second reflected pulse, the at least one second reflected pulse comprising at least one RF pulse from the second set of RF pulses reflected off of the object, and determine, based on the transmitting of the second set of RF pulses and the receiving of the at least one second reflected pulse a proximity of the object, and whether the object is within a predetermined field of view (FOV).

Another example device, according to this disclosure, comprises means for transmitting, in an omnidirectional proximity sensing mode, a first set of radio frequency (RF) pulses, the first set of RF pulses comprising one or more pulses, means for receiving, in the omnidirectional proximity sensing mode, at least one first reflected pulse, means for determining, in the omnidirectional proximity sensing mode, an object's presence within a threshold distance of the device, based on the receiving the at least one first reflected pulse, means for operating in a directional proximity sensing mode in response to determining the object's presence, and means for transmitting, in the directional proximity sensing mode, a second set of RF pulses, the second set of RF pulses comprising a plurality of pulses. The device further comprises means for receiving, in the directional proximity sensing mode, at least one second reflected pulse, the at least one second reflected pulse comprising at least one RF pulse from the second set of RF pulses reflected off of the object, and means for determining, based on the transmitting of the second set of RF pulses and the receiving of the at least one second reflected pulse a proximity of the object, and whether the object is within a predetermined field of view (FOV).

An example non-transitory computer-readable medium, according to this disclosure, comprises instructions embedded therewith for operating a radar system to perform radar proximity detection. The instructions, when executed by one or more processing units, cause the one or more processing units to, in an omnidirectional proximity sensing mode: transmit, with a transmitter of the radar system, a first set of radio frequency (RF) pulses, the first set of RF pulses comprising one or more pulses, receive, with a receiver of the radar system, at least one first reflected pulse, determine an object's presence within a threshold distance of the radar system, based on the receiving the at least one first reflected pulse, and in response to determining the object's presence, operate in a directional proximity sensing mode. The instructions, when executed by one or more processing units, further cause the one or more processing units to, in the directional proximity sensing mode: transmit, with a transmitter antenna array of the transmitter, a second set of RF pulses, the second set of RF pulses comprising a plurality of pulses, receive, with a receiver antenna array of the receiver, at least one second reflected pulse, the at least one second reflected pulse comprising at least one RF pulse from the second set of RF pulses reflected off of the object, and determine, based on the transmitting of the second set of RF pulses and the receiving of the at least one second reflected pulse a proximity of the object, and whether the object is within a predetermined field of view (FOV).

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. The ensuing description provides embodiment(s) only and is not intended to limit the scope, applicability or configuration of the disclosure. Rather, the ensuing description of the embodiment(s) will provide those skilled in the art with an enabling description for implementing an embodiment. It is understood that alternative embodiments may include various changes may be made in the function and arrangement of elements.

As noted, radar sensors can be used in modern electronic devices for multiple applications, including proximity detection. The utilization of radar sensing in this manner can be useful for a variety of reasons. Of particular relevance is the fact that modems used for wireless communication in modern mobile devices (e.g., mobile phones, tablets) are capable of performing radar sensing, in addition to providing data communication functionality. As such, embodiments employing radar sensing for proximity determination may not need a separate proximity sensor for proximity determinations. Additionally, radar has an ability to implement a flexible FOV (e.g., a flexible range of azimuth, elevation, distance, velocity (Doppler), and signal-to-noise ratio (SNR)) for which the radar will detect proximity objects (also referred to herein as "proximity targets"). The flexible/parametric FOV can be obtained using beamforming (BF) and Digital Signal Processing (DSP) techniques (e.g., digital BF, analog BF, or hybrid BF). Thus, unlike other proximity detection technologies, radar has the capability of determining directionality of an object, in addition to distance.

Although embodiments described herein are described in the context of proximity applications, embodiments are not so limited. Embodiments may be used for other object-sensing applications (e.g., the sensing of location, distance, velocity, etc. of objects). A person of ordinary skill in the art will appreciate other such applications.

Figure 1:
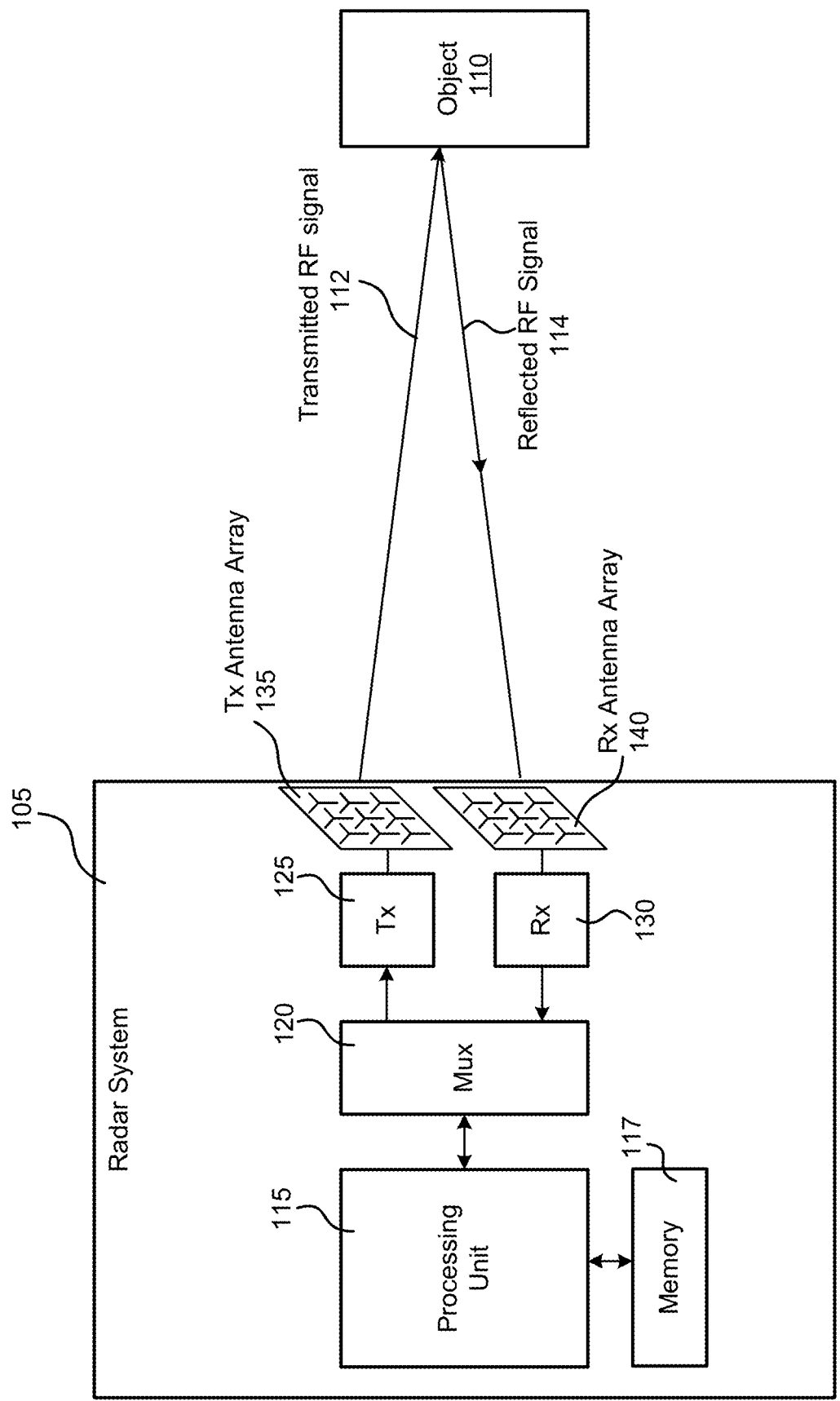
FIG. 1 is a block diagram of a radar system performing radar-based directional proximity sensing, according to an embodiment.
Figure 12:
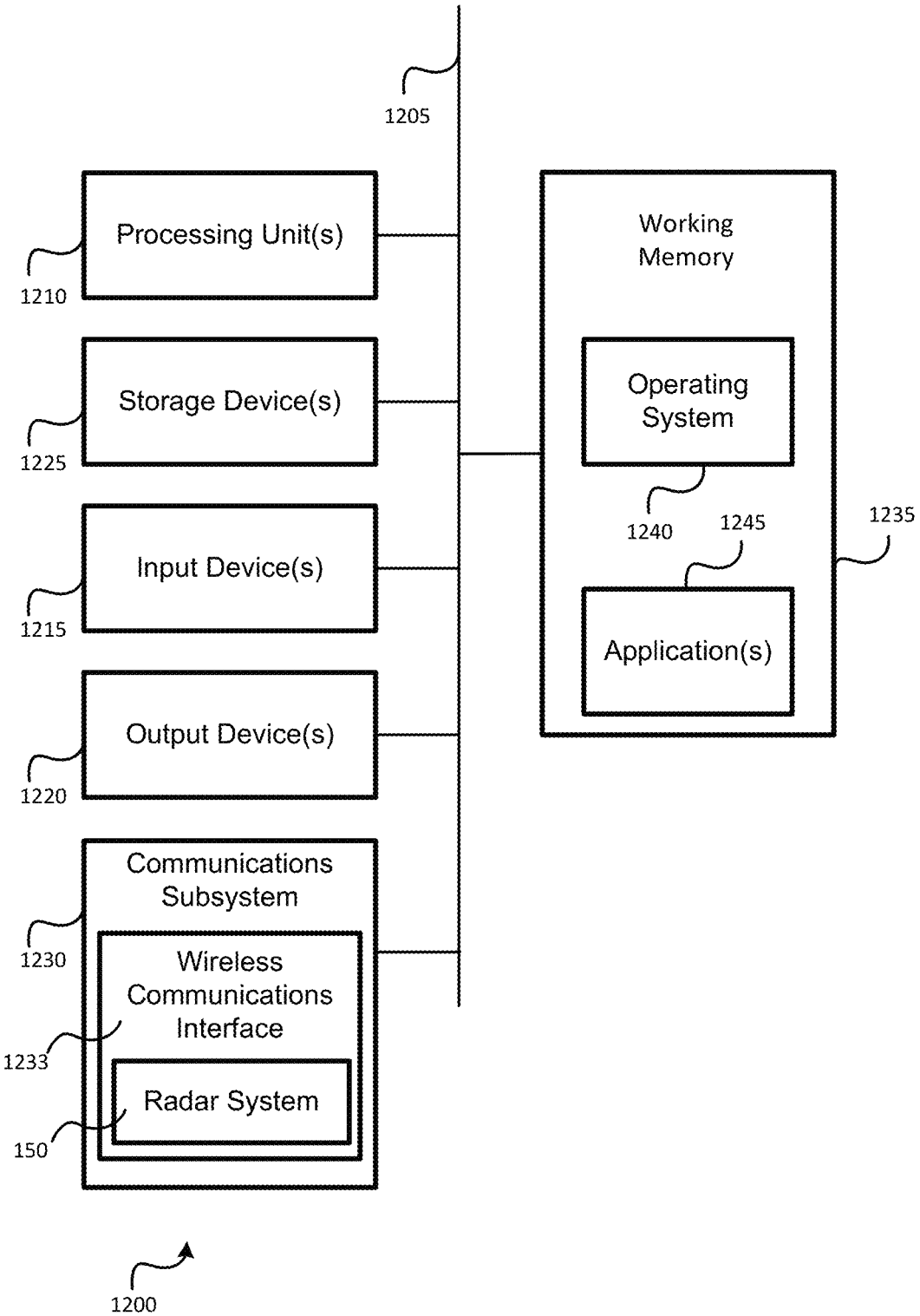
FIG. 12 is a block diagram of an embodiment of an electronic device.

FIG. 1 is a block diagram of a radar system 105 performing radar-based directional proximity sensing, according to an embodiment. As used herein, the terms "waveform" and "sequence" and derivatives thereof are used interchangeably to refer to RF signals generated by a transmitter of the radar system and received by a receiver of the radar system for object detection. A "pulse" and derivatives thereof are generally referred to herein as waveforms comprising a sequence or complementary pair of sequences transmitted and received to generate a CIR. The radar system 105 may comprise a standalone device or may be integrated into a larger electronic device, such as a mobile phone or other device. (Example components of such an electronic device are illustrated in FIG. 12 and discussed in detail hereafter.)

With regard to the functionality of the radar system 105 in FIG. 1, the radar system 105 can detect the proximity of an object 110 by generating a series of transmitted RF signals 112 (comprising one or more pulses). Some of these transmitted RF signals 112 reflect off of the object 110, and these reflected RF signals 114 are then processed by the radar system 105 using BF and DSP techniques (including leakage cancellation) to determine the object's location (azimuth, elevation, velocity, and range) relative to the radar system 105. Because embodiments may implement a flexible FOV, the radar system 105 can detect an object 110 within a select volume of space. This volume of space can be defined by a range of azimuths, elevations, and distances from the radar system 105. (As described below, this volume of space may also be defined by an FOV (a range of azimuths and elevations) and a range of distances within the FOV or from an area of interest corresponding to the FOV.)

To enable radar proximity detecting radar system 105 includes a processing unit 115, memory 117, multiplexer (mux) 120, Tx processing circuitry 125, and Rx processing circuitry 130. (The radar system 105 may include additional components not illustrated, such as a power source, user interface, or electronic interface) It can be noted, however, that these components of the radar system 105 may be rearranged or otherwise altered in alternative embodiments, depending on desired functionality. Moreover, as used herein, the terms "transmit circuitry" or "Tx circuitry" refer to any circuitry utilized to create and/or transmit the transmitted RF signal 112. Likewise, the terms "receive circuitry" or "Rx circuitry" refer to any circuitry utilized to detect and/or process the reflected RF signal 114. As such, "transmit circuitry" and "receive circuitry" may not only comprise the Tx processing circuitry 125 and Rx processing circuitry 130 respectively, but may also comprise the mux 120 and processing unit 115. In some embodiments, the processing unit may compose at least part of a modem and/or wireless communications interface. In some embodiments, more than one processing unit may be used to perform the functions of the processing unit 115 described herein.

The Tx processing circuitry 125 and Rx circuitry 130 may comprise subcomponents for respectively generating and detecting RF signals. As a person of ordinary skill in the art will appreciate, the Tx processing circuitry 125 may therefore include a pulse generator, digital-to-analog converter (DAC), a mixer (for up-mixing the signal to the transmit frequency), one or more amplifiers (for powering the transmission via Tx antenna array 135), etc. The Rx processing circuitry 130 may have similar hardware for processing a detected RF signal. In particular, the Rx processing circuitry 130 may comprise an amplifier (for amplifying a signal received via Rx antenna 140), a mixer for down-converting the received signal from the transmit frequency, an analog-to-digital converter (ADC) for digitizing the received signal, and a pulse correlator providing a matched filter for the pulse generated by the Tx processing circuitry 125. The Rx processing circuitry 130 may therefore use the correlator output as the CIR, which can be processed by the processing unit 115 (or other circuitry) for leakage cancellation as described herein. Other processing of the CIR may also be performed, such as object detecting, range, speed, or direction of arrival (DoA) estimation.

BF is further enabled by a Tx antenna array 135 and Rx antenna array 140. Each antenna array 135, 140 comprises a plurality of antenna elements. It can be noted that, although the antenna arrays 135, 140 of FIG. 1 include two-dimensional arrays, embodiments are not so limited. Arrays may simply include a plurality of antenna elements along a single dimension that provides for spatial cancellation between the Tx and Rx sides of the radar system 105. As a person of ordinary skill in the art will appreciate, the relative location of the Tx and Rx sides, in addition to various environmental factors can impact how spatial cancellation may be performed.

It can be noted that the properties of the transmitted RF signal 112 may vary, depending on the technologies utilized. Techniques provided herein can apply generally to "mmWave" technologies, which typically operate at 57-71 GHz, but may include frequencies ranging from 30-300 GHz. This includes, for example, frequencies utilized by the 802.11ad Wi-Fi standard (operating at 60 GHz). That said, some embodiments may utilize radar with frequencies outside this range. For example, in some embodiments, 5G frequency bands (e.g., 28 GHz) may be used. Because radar may be performed in the same busy bands as communication, hardware may be utilized for both communication and radar sensing, as previously noted. For example, one or more of the components of the radar system 105 shown in FIG. 1 may be included in a wireless modem (e.g., Wi-Fi or 5G modem). Additionally, techniques may apply to RF signals comprising any of a variety of pulse types, including compressed pulses (e.g., comprising Chirp, Golay, Barker, or Ipatov sequences) may be utilized. That said, embodiments are not limited to such frequencies and/or pulse types. Additionally, because the radar system may be capable of sending RF signals for communication (e.g., using 802.11 communication technology), embodiments may leverage channel estimation used in communication for performing proximity detection as provided herein. Accordingly, the pulses may be the same as those used for channel estimation in communication.

As noted, the radar system 105 may be integrated into an electronic device in which proximity detecting is desired. For example, the radar system 105, which can perform radar-based proximity detecting, may be part of communication hardware found in modern mobile phones. Other devices, too, may utilize the techniques provided herein. These can include, for example, other mobile devices (e.g., tablets, portable media players, laptops, wearable devices, virtual reality (VR) devices, augmented reality (AR) devices), as well as other electronic devices (e.g., security devices, on-vehicle systems). That said, electronic devices into which a radar system 105 may be integrated are not limited to mobile devices. Furthermore, radar-based proximity sensing as described herein may be performed by a radar system 105 that may not be otherwise used in wireless communication.

Although capable of providing a high degree of accuracy, directional proximity sensing shown in FIG. 1, if performed frequently, can be problematic in certain applications. For example, to perform a scan for a nearby object 110 the radar system 105 may transmit a large number of transmitted RF signals 112 such that each antenna element in the Rx antenna array 140 receives a reflected RF signal 114 corresponding to a transmitted RF signal 112 transmitted from each antenna element in the Tx antenna array 135. Moreover, the radar system 105 may perform a scan very frequently (e.g., several times per second). And thus, the directional proximity sensing performed by the radar system 105 may consume a large amount of power. This may be problematic for low-power applications.

According to embodiments described herein, radar-based directional proximity sensing power-saving techniques can be implemented to help reduce the power consumption used in directional radar sensing. In particular, according to some embodiments, a radar system can first operate in a low-power, omnidirectional proximity sensing mode in which signals are transmitted having no directionality. Once an object is detected, the radar system can then operate in a higher-power directional proximity sensing mode to provide accurate directional detection capabilities in the desired FOV.

Figure 2:
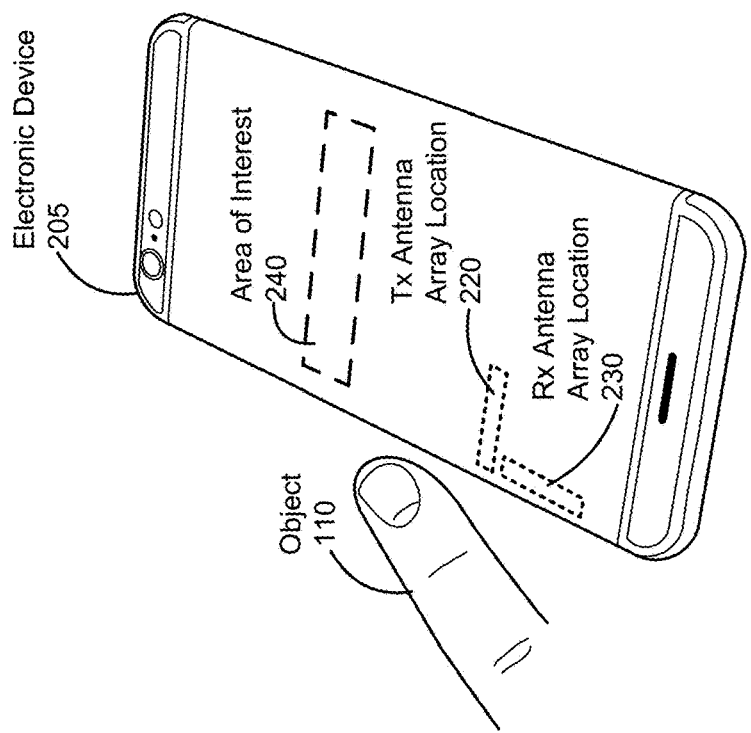
FIG. 2 is an illustration of how radar proximity detection may be used by a radar system, according to an embodiment.

FIG. 2 is an illustration of how radar proximity detection may be used by an electronic device 205, according to an embodiment. In this example, the electronic device 205 comprises a mobile phone having a radar system 105 with a Tx antenna array 135 and Rx antenna array 140 (not shown) embedded within the body of the electronic device 205. The locations of the Tx antenna array and Rx antenna array are shown in FIG. 2 by Tx antenna array location 220 and Rx antenna array location 230, respectively. An area of interest 240 (corresponding to an FOV of the radar system of the radar system 105) is defined such that, if an object 110 (a finger) comes within a certain threshold distance of the area of interest 240, the radar system 105 of the electronic device 205 indicates that an object has been detected. Before using directional proximity sensing, however, the radar system 105 can first perform radar scans in an omnidirectional proximity sensing mode to detect whether a nearby object 110 is within a threshold distance. If an object 110 is detected, the radar system 105 can then enter a directional proximity sensing mode to determine whether the object 110 is within a threshold distance of the area of interest 240.

Figure 3:
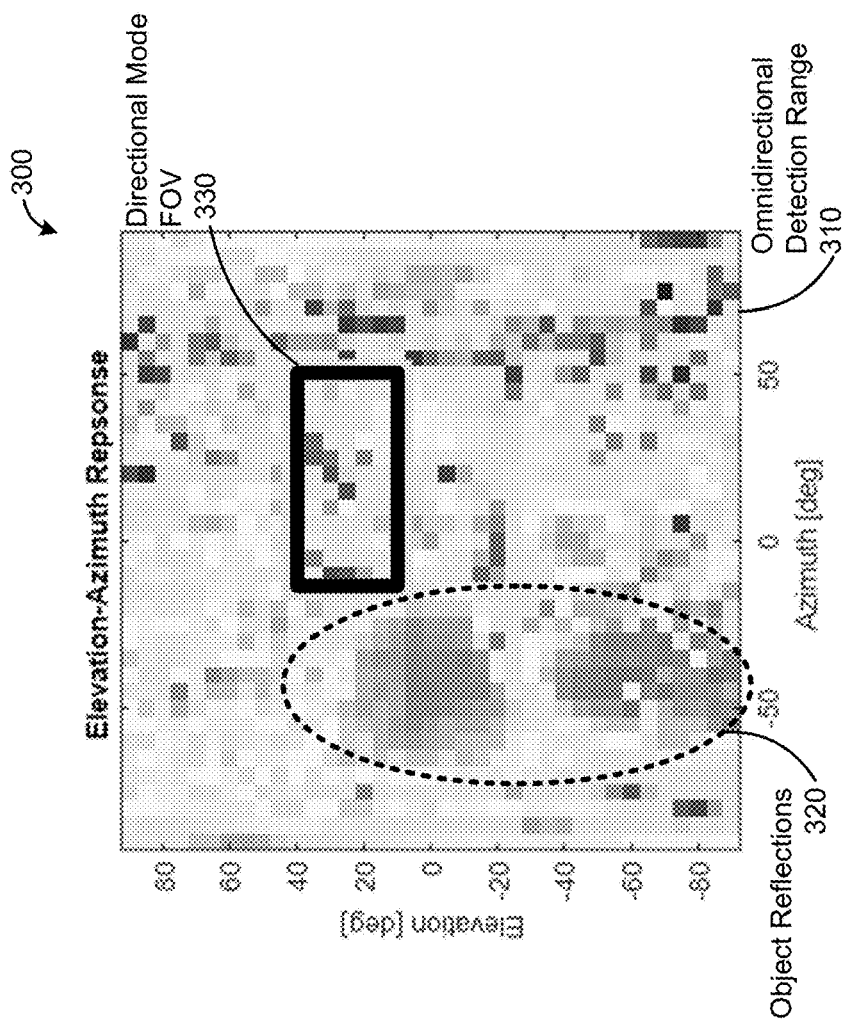
FIG. 3 is a graph showing an elevation-azimuth response of radar scanning performed by the radar system in the scenario shown in FIG. 2.

FIG. 3 is a graph showing an elevation-azimuth response 300 of radar scanning performed by the radar system 105 of the electronic device 205 in the scenario shown in FIG. 2. Here, because the object 110 in FIG. 2 is within a threshold distance of electronic device 205, the object is detected while the radar system 105 is performing radar scans in an omnidirectional proximity sensing mode. After switching to directional proximity sensing, the radar system 105 then performs radar scanning using BF and DSP to obtain the elevation-azimuth response 300. In the elevation-azimuth response 300 illustrated in FIG. 3, each azimuth/elevation combination is represented as a "pixel" in the graph, where darker pixels represent reflections (higher detected maximum SNR).

In this example, the omnidirectional scanning is capable of detecting an object 110 within an omnidirectional detection range 310 across various elevations (ranging from −90° to 90°) and azimuths (ranging from −100° to 100°). The use of a backplane or other physical barrier can help exclude the detection of objects in certain areas (e.g., behind the electronic device 205) in which object detection in the omnidirectional proximity sensing mode is not desired. And thus, the omnidirectional detection range 310 may be different in different applications.

The elevation-azimuth response 300 obtained after directional proximity sensing is performed reveals that the object reflections 320 (corresponding to object 110 in FIG. 2) fall outside a directional mode FOV 330 (which, as noted, corresponds to the area of interest 240 of the radar system 105 in FIG. 2). As such, the radar system 105 can conclude that the object 110 is not located within a threshold proximity of the area of interest 240. It can be noted that the object reflections 320 are provided in FIG. 3 to illustrate where the object reflections 320 may be located with respect to the directional mode FOV 330. In some embodiments, the elevation-azimuth response may be limited to the directional mode FOV 330. That said, as noted below, information outside the directional mode FOV 330 may be used to help increase the accuracy of object detection (e.g., reducing false positives) in directional proximity sensing mode.

Because the directional mode FOV 330 is configurable, the radar system 105 can define an area of interest 240 suited to a particular application. Furthermore, when an object is detected to be within a threshold distance of the area of interest 240, the radar system 105 can respond in any of a variety of ways, depending on desired functionality. In some embodiments, the physical layer performing the radar scanning can provide a notification of the proximity detection to a higher layer (e.g., software layer, such as the operating system), which can respond appropriately.

In omnidirectional proximity sensing mode, BF is not used by the radar system. And thus, a scan may be performed by a single antenna element from each of the Tx antenna array 135 and the Rx antenna array 140 (although multiple elements from either or both arrays may be optionally used). A scan in the omnidirectional proximity sensing mode may comprise, for example, one or more pulses of RF signals sent periodically in a manner that helps facilitate low-power operation. In some embodiments, for example, a four-pulse burst of signals is transmitted every 50 ms (e.g., repeated at 20 Hz). Other embodiments may use a larger or smaller amount of pulses and/or a different periodicity, depending on the desired balance between performance and power savings. (The fewer pulses used, the more power savings the radar system may have. However, decreasing the number of pulses may also decrease the SNR, which may result in false positives.

Figure 4:
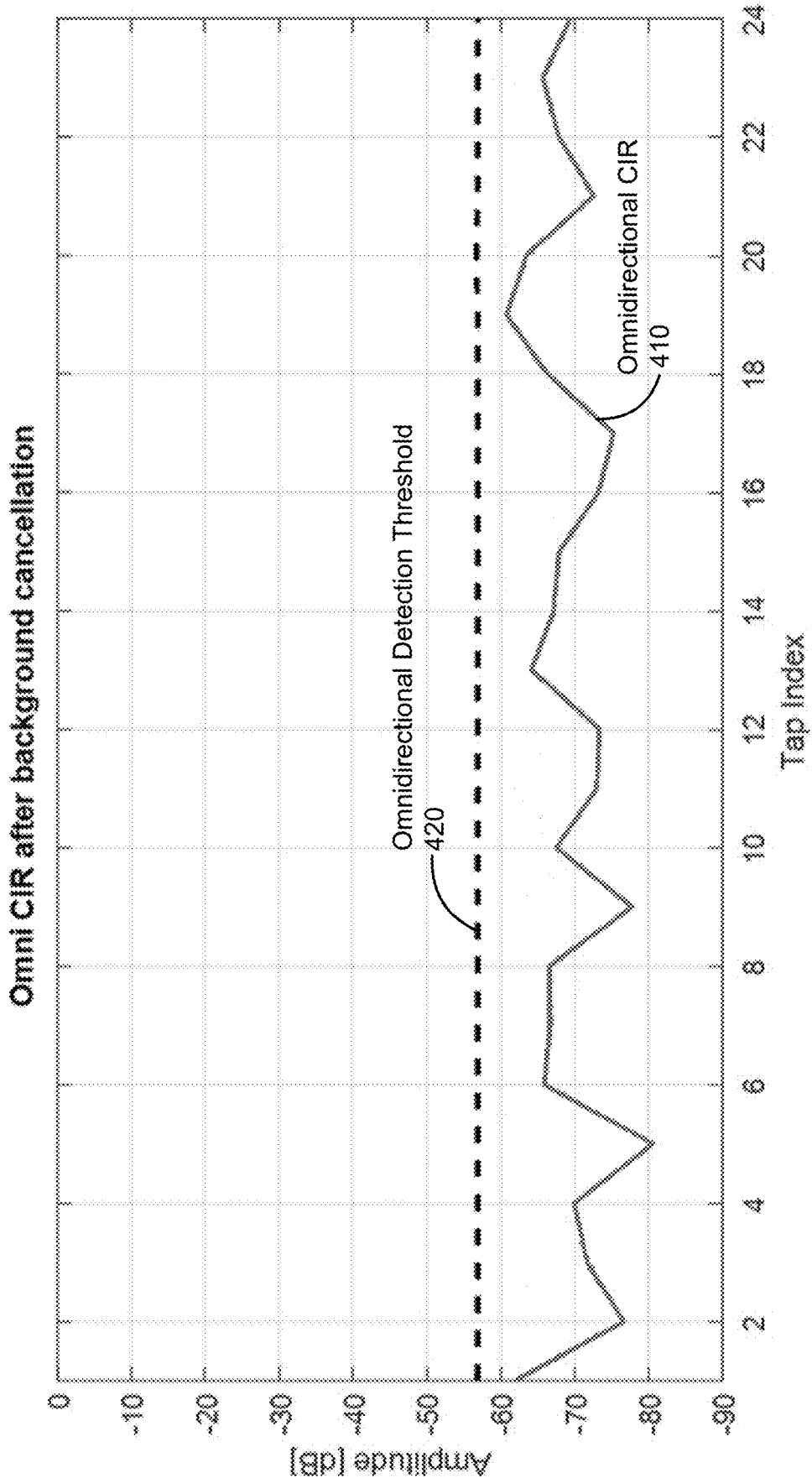
FIGS. 4 and 5 are example graphs plotting in omnidirectional channel impulse response (CIR) across various taps, after leakage cancellation.

FIG. 4 is an example graph plotting in omnidirectional CIR 410 across various taps, after leakage cancellation. The omnidirectional CIR 410 (e.g., the mean CIR for multiple reflected signals) is plotted over a tap index, which is indicative of when reflected RF signals are sampled. As a person of ordinary skill in the art will appreciate, the initial point of the tap index may be chosen arbitrarily. (This point can be accounted for when determining a distance of a detected object from the electronic device 110.)

To ignore objects beyond a threshold distance, the omnidirectional CIR may take a limited number of taps. The threshold distance can be established, based on desired functionality. In some embodiments, for example, taps above 10 cm may be ignored. Other embodiments may set a higher or lower threshold distance, depending on desired functionality. As discussed in more detail below, because the distance between taps may be large relative to a range for which proximity detection is desired interpolation techniques may be used to help determine the distance of an object with more precision. In some embodiments, for example, the distance between taps may exceed 4 cm. Although this resolution may be sufficient for certain applications, interpolation techniques can be used to increase the resolution to less than 1 cm.

The detection of an object in omnidirectional proximity sensing mode may be based on both amplitude (SNR) and fine range. Thus, omnidirectional proximity sensing may depend on determining whether, for taps corresponding to a range of interest (7 cm to 15 cm, as an example), SNR exceeds an omnidirectional detection threshold 420. Depending on desired functionality, this threshold may be set at a value that sufficiently cancels out noise while also reliably detecting objects. In this example, because a maximum value of the omnidirectional CIR 410 (for the taps of interest) does not exceed the omnidirectional detection threshold 420, no object is detected from the omnidirectional scan, and the electronic device 110 can continue scanning in the omnidirectional proximity sensing mode.

Figure 5:
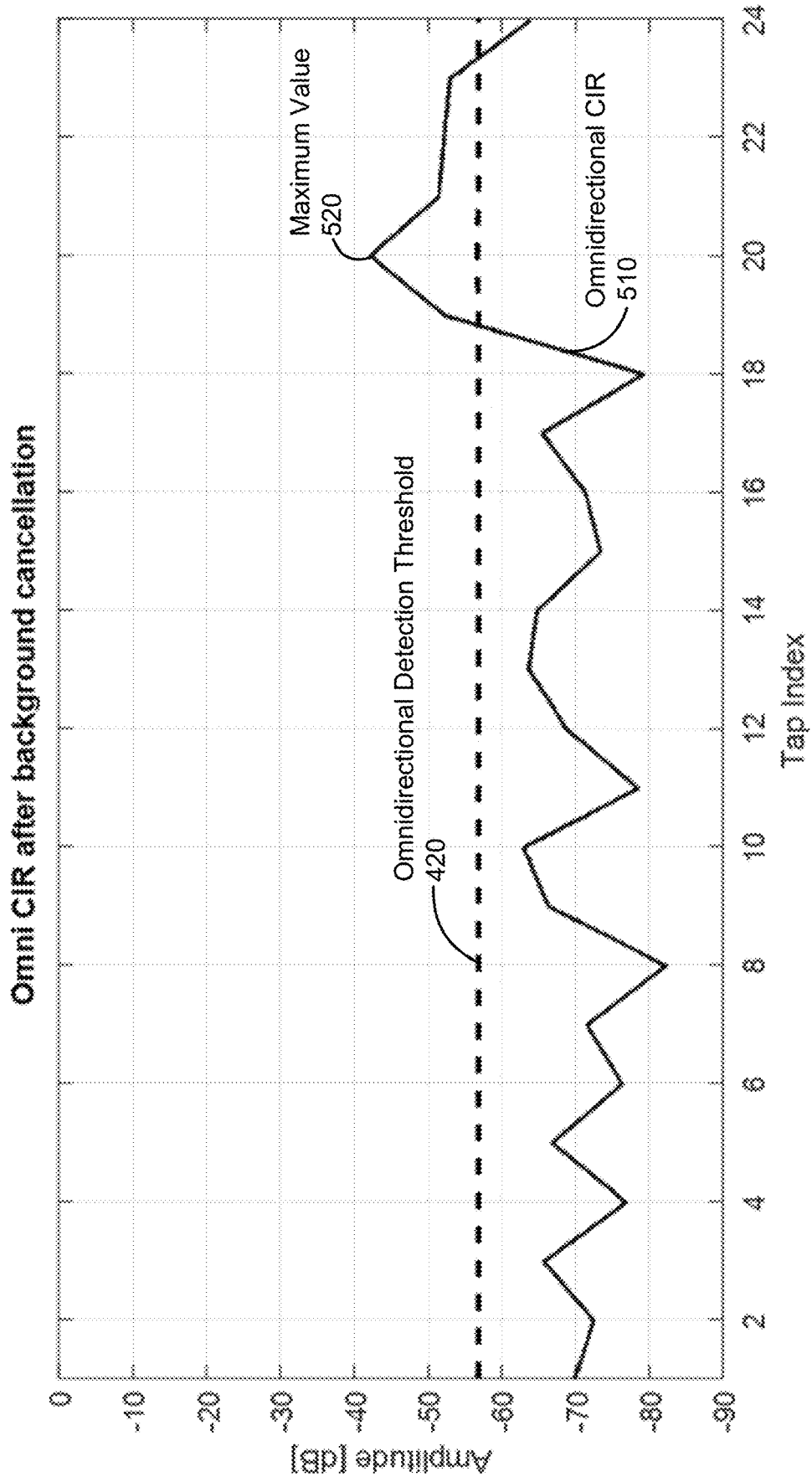

FIG. 5 is a graph, similar to the graph in FIG. 4, in which an omnidirectional CIR 510 is plotted across various taps. This may comprise an omnidirectional scan performed by the same electronic device 110, with the same omnidirectional detection threshold 420. Here, however, the maximum value 520 of the omnidirectional CIR 510 exceeds the omnidirectional detection threshold 420. And thus, an object is detected, and the electronic device can perform directional proximity sensing to determine a more accurate location of the detected object.

As illustrated in FIG. 3, directional proximity sensing can provide an elevation-azimuth response that allows for determination of whether an object is within a desired range of a desired FOV. Just as the FOV can be adjusted depending on desired functionality, so too can the desired range. For example, in some applications, a desired range may comprise a maximum (e.g., proximity sensing for an object less than 10 cm away). Other applications may include a desired minimum and maximum (e.g., proximity sensing foreign object between 7 cm and 15 cm away).

Depending on desired functionality, directional proximity sensing can be performed over a predetermined period of time (e.g., for a predetermined window of time after the omnidirectional proximity sensing has detected an object). Additionally or alternatively, embodiments may perform directional proximity sensing contingent on whether an object is detected within a desired range and FOV. If so, the radar system 105 can continue conducting directional proximity sensing. Otherwise, if an object is not detected within the desired range and FOV (e.g., as shown in the elevation-azimuth response 300 in FIG. 3), the radar system 105 can revert back to omnidirectional proximity sensing.

Figure 6A:
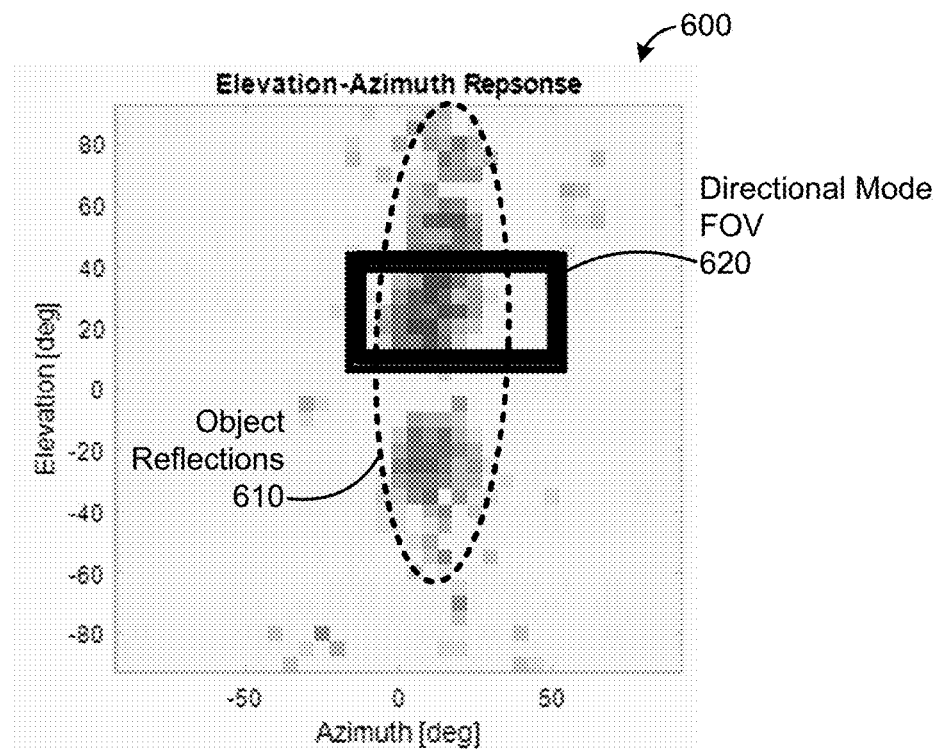
FIG. 6A is a graph showing the elevation-azimuth response of directional proximity sensing in an example in which the directional proximity sensing senses an object.

FIG. 6A is a graph showing the elevation-azimuth response 600 of the directional proximity sensing in an example in which the directional proximity sensing senses an object. Similar to the elevation-azimuth response 300 of FIG. 3, the elevation-azimuth response 600 of FIG. 6A includes object reflections 610. Here, however, the object reflections 610 fall within the directional proximity sensing mode FOV 620. And thus, a final outcome of the proximity sensing is that an object has been detected within the desired range of a desired area of interest.

Figure 6B:
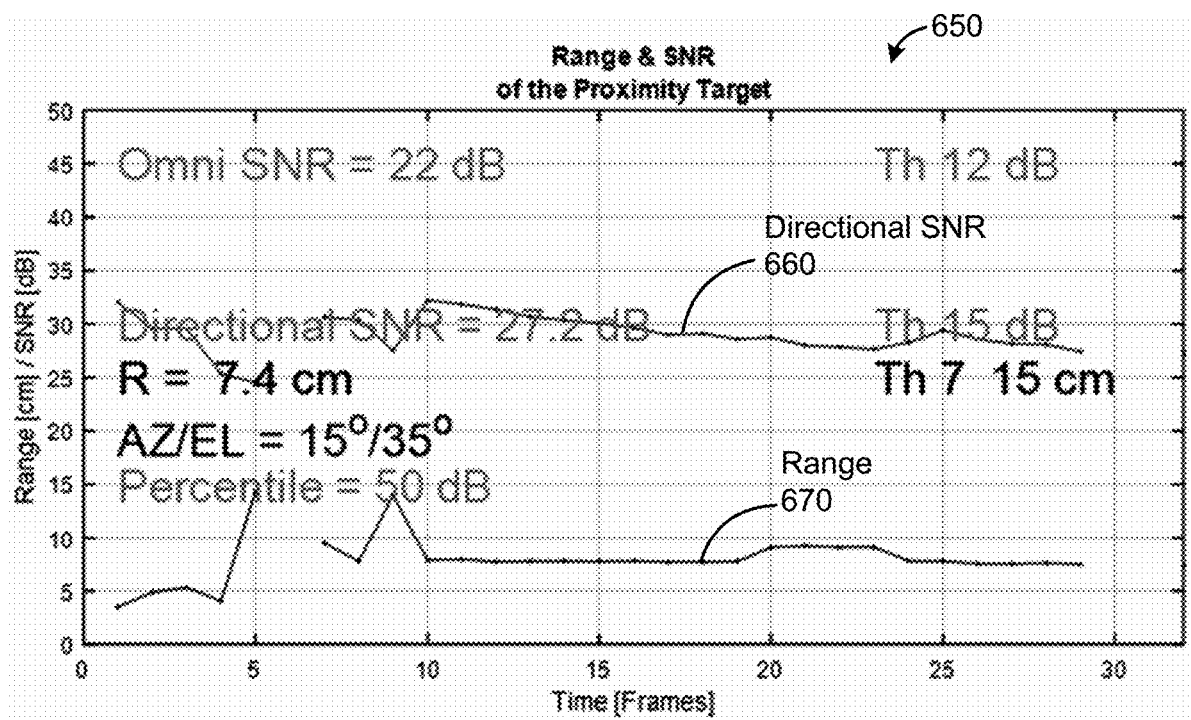
FIG. 6B is a graph related to the elevation-azimuth response of FIG. 6A.

FIG. 6B is a graph 650 related to the elevation-azimuth response 600 of FIG. 6A. The graph 650 plots SNR and range measurements over time and shows additional related measurements and thresholds. In this example, a detected omnidirectional SNR maximum was 22 dB, which exceeded the 12 dB SNR threshold, and therefore directional proximity sensing was performed. (It can be noted directional threshold may differ from the omnidirectional threshold by the expected BF gain plus some margin for error.) At the azimuth and elevation at which directional SNR was determined to have a peak value within the directional mode FOV 620 (15° azimuth and 35° elevation), the directional SNR 660 is plotted, as is the range 670. In this example, the final values at frame 29 for directional SNR 660 and range 670 are 27.2 dB and 7.4 cm, respectively. The 27.2 dB value for the directional SNR 660 exceeds the 15 dB threshold in this example, and the 7.4 cm range falls within the desired range of 7-15 cm.

As previously mentioned, measurements outside the directional mode FOV can be used to help increase the accuracy of object detection within the directional mode FOV. To help ensure that a side lobe of an object outside the directional mode FOV of the directional proximity sensing does not create a false detection of a proximity target within the directional mode FOV, various schemes may be employed to filter out such side lobes. Using a larger BF range (e.g., the entire range of the elevation-azimuth response 600 of FIG. 6A) and percentile/max-to-mean power ratio, side lobes may be identified as such, and false positives can be reduced. For example, a ratio can be calculated from a maximum or mean amplitude within the directional mode FOV 620 in FIG. 6A and a mean amplitude outside the directional mode FOV 620. If the ratio exceeds a threshold, it may confirm that an object is detected within the directional mode FOV 620 (if other thresholds are met). A similar solution may be conducted using a histogram of the BF output. Additionally or alternatively, other adaptive knowing schemes may be utilized.

Depending on desired functionality, various techniques may be employed to help improve the accuracy of range and/or SNR measurements in omnidirectional proximity sensing mode, directional proximity sensing mode, or both.

Figure 7:
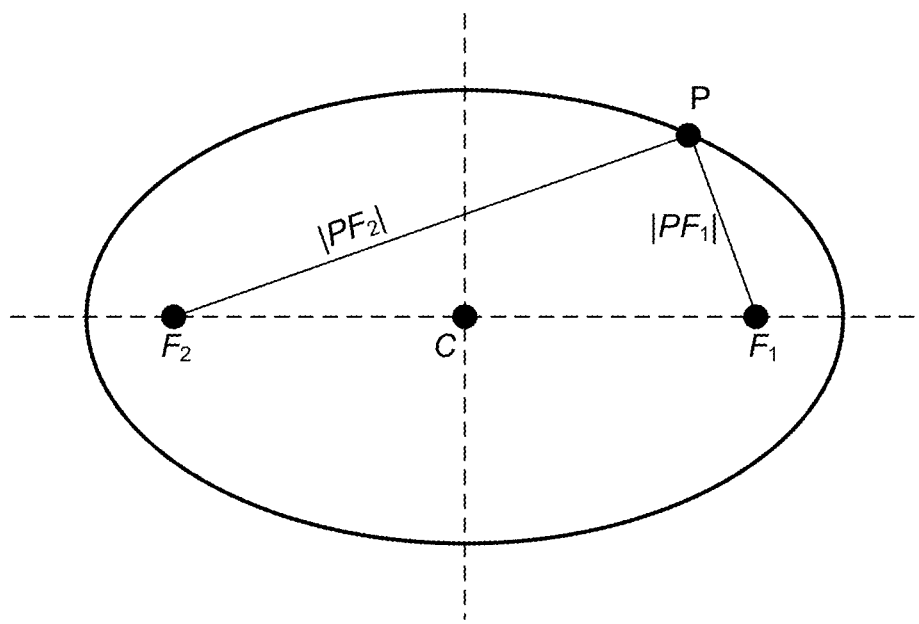
FIGS. 7-10 are illustrations of the geometry of an ellipse, which can be used to more accurately determine object distance, according to some embodiments.

FIG. 7 is an illustration of the geometry of an ellipse, which can be used to more accurately determine distance in omnidirectional and/or directional proximity sensing mode, according to some embodiments. Because proximity sensing can involve sensing objects at close distances, the distance between the detected object and a Tx antenna may be different than the distance between the object and an Rx antenna. The utilizing the geometry of an ellipse, embodiments may account for these differences.

In FIG. 7, the ellipse is defined as the a of points having the same sum of distances, $|PF_1|+|PF_2|$, relative to foci, $F_1$ and $F_2$. Similarly, an ellipse may be determined from a time-of-flight measurement made in an omnidirectional proximity sensing mode to indicate a distance to a detected object. For example, a time-of-flight measurement between a Tx antenna array (e.g., Tx antenna array 135 of FIG. 1) located at $F_1$ and an Rx antenna array (e.g., Rx antenna array 140) located at $F_2$, in which the RF signal reflected off of an object at point P would result in a distance measurement of $|PF_1|+|PF_2|$. The ellipse can then be calculated, and a distance of the object from a center point, C, can be estimated based on the geometry of the ellipse.

Figure 8:
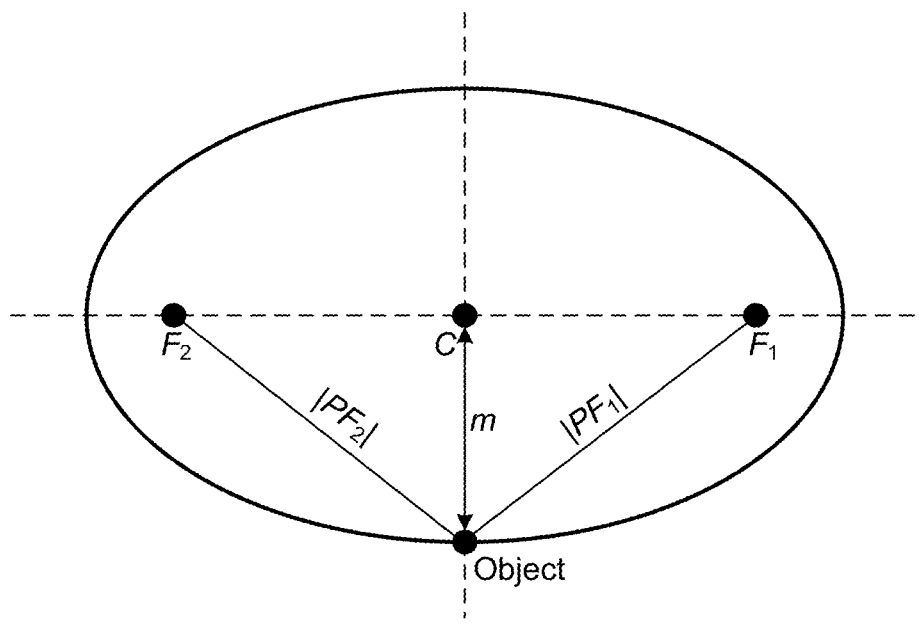

For example, according to some embodiments in which a radar system 105 detects an object in an omnidirectional proximity sensing mode, the object can be assumed to be at azimuth and elevation zero, as shown in FIG. 8. If azimuth and elevation are assumed to be zero, the object may be assumed to be equidistant from the transmitting and receiving elements (i.e., $|PF_1|=|PF_2|$). The distance, m, between the object and the center point, C, can then be determined from the geometry of the ellipse. (It can be noted that in some embodiments, antenna elements may be offset from the coordinate system used to establish azimuth and elevation. In such embodiments, the determination of the ellipse and the distance can account for this offset.) After determining the distance, m, of the object, the radar system 105 can then switch to directional proximity sensing, as detailed in the previously-described embodiments.

Figure 9:
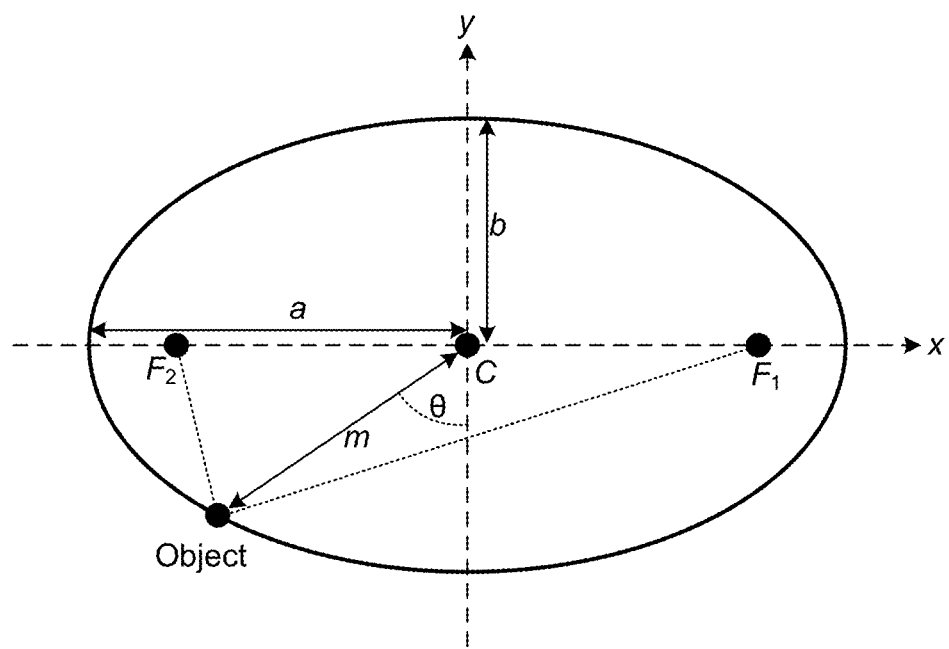

FIG. 9 illustrates how the geometry of an ellipse can be leveraged to determine a more accurate position of a detected object in directional proximity sensing. Because directional proximity sensing can provide an angle, θ, to the object, an accurate determination for distance, m, can be calculated using the following equations for ellipse geometry:

$$(x, y) = m \cdot (\sin(\theta), \cos(\theta)), \qquad (1)$$

and $$\frac{x^2}{a^2} + \frac{y^2}{b^2} = m^2\left(\frac{\sin^2(\theta)}{a^2} + \frac{\cos^2(\theta)}{b^2}\right) = 1, \qquad (2)$$

where, variables a and b are respectively the semi-major axis and semi-minor axis of the ellipse, as illustrated in FIG. 9.

In some embodiments, this can be expanded to three dimensions to determine an accurate distance, m, of an object detected at a given azimuth, Az, and elevation, El, from center point, C. The 3D equations used to solve for m are:

$$(x, y, z) = m \cdot (\sin(Az)\cos(El), \cos(Az)\cos(El), \sin(El)), \qquad (3)$$

and $$\frac{x^2}{a^2} + \frac{y^2 + z^2}{b^2} = \qquad (4)$$

$$m^2\left(\frac{\sin^2(Az)\cos^2(El)}{a^2} + \frac{\cos^2(Az)\cos^2(El) + \sin^2(El)}{b^2}\right) = 1.$$

As previously noted, interpolation techniques (e.g., parabolic interpolation) can be used to determine an accurate distance of an object located at a distance between two taps in a radar scan (for either or both omnidirectional and directional proximity sensing). Additionally or alternatively, some embodiments may use an SNR-averaged range estimation to determine a robust range estimate without angular information. Put briefly, SNR-averaged range estimation can take an average SNR value of two taps to determine the location of an object located between the two taps. This can be written mathematically as follows:

$$\hat{a} = \frac{\rho_{n1}a_{n1} + \rho_{n2}a_{n2}}{\rho_{n1} + \rho_{n2}}, \qquad (5)$$

where $\rho_{n1}$ and $a_{n1}$ are respective SNR and range estimates for a first tap n1, $\rho_{n2}$ and $a_{n2}$ are respective SNR and range estimates for a second tap n2, and â is the SNR-averaged range estimation.

Figure 10:
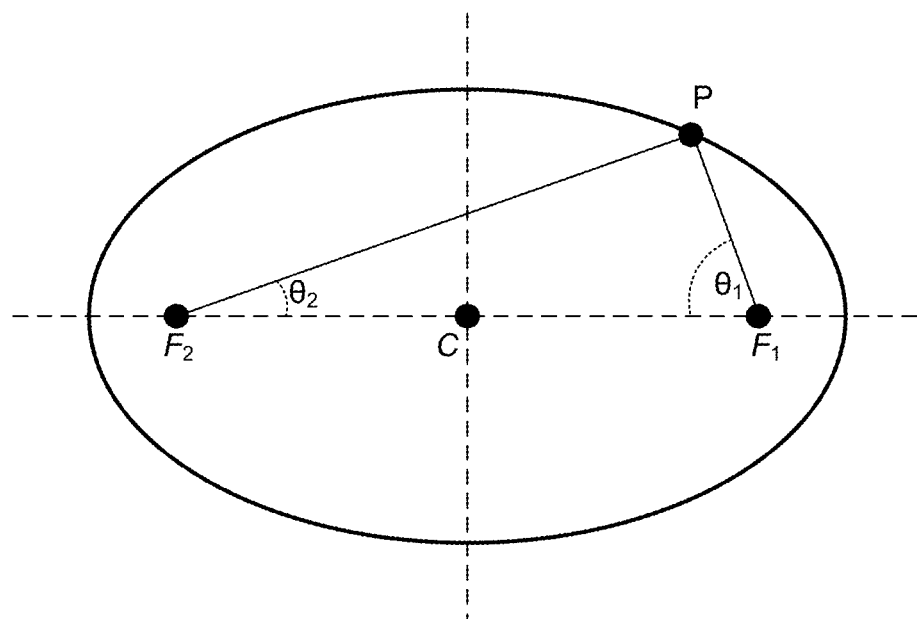

An additional measure that may be implemented to help ensure accuracy in directional proximity sensing mode, according to some embodiments, comprises using near-field BF that accounts for differences in the location of Tx and Rx antenna arrays in. As previously noted, proximity detection can occur at close distances, where the difference in location between a Tx antenna and Rx antenna may be impactful to a range measurement. More specifically, an angle between an Rx antenna array and a detected object may be different than the angle between the Tx antenna array and the object. FIG. 10, which illustrates an ellipse similar to FIG. 7, provides an example of how angles $\theta_1$ and $\theta_2$ between antenna arrays respectively located at positions $F_1$ and $F_2$ and the object located at point P can be different. Embodiments may therefore take this angle into account when beamforming.

For example, embodiments that do not account for differences in the location of Tx and Rx antenna arrays may utilize the following equation to calculate an elevation-azimuth response at a given tap by combining CIRs for different transmit and receive antennas:

$$a(Az, El) = \begin{bmatrix} a_{n_{TX},1}(Az, El)a_{n_{RX},1}(Az, El) \\ a_{n_{TX},2}(Az, El)a_{n_{RX},2}(Az, El) \\ \vdots \\ a_{n_{TX},N}(Az, El)a_{n_{RX},N}(Az, El) \end{bmatrix}, \quad (6)$$

where azimuth and elevation (Az, El) in the elevation-azimuth response is computed by multiplying a transmit vector $a_{n_{TX}}(Az, El)$ with a receive vector $a_{n_{TX}}(Az, El)$ across all Tx antenna elements (1 to N) and Rx antenna elements (1 to N). The transmit a vector $a_{n_{TX}}(Az, El)$ and receive vector $a_{n_{TX}}(Az, El)$ can be computed analytically using the antenna array structure, or may be measured empirically.

In contrast, embodiments that account for differences in the location of Tx and Rx antenna arrays may take into account the range, azimuth, and elevation $(r_{Tx}, Az_{Tx}, El_{Tx})$ of Tx antenna arrays relative to range, azimuth, and elevation $(r_{Rx}, Az_{Rx}, El_{Rx})$ of Rx antenna arrays as follows:

$$a(Az, El) \cong a(r_{TX}, Az_{TX}, El_{TX}) = \begin{bmatrix} a_{n_{TX},1}(r_{TX}, Az_{TX}, El_{TX})a_{n_{RX},1}(r_{RX}, Az_{RX}, El_{RX}) \\ a_{n_{TX},2}(r_{TX}, Az_{TX}, El_{TX})a_{n_{RX},2}(r_{RX}, Az_{RX}, El_{RX}) \\ \vdots \\ a_{n_{TX},N}(r_{TX}, Az_{TX}, El_{TX})a_{n_{RX},N}(r_{RX}, Az_{RX}, El_{RX}) \end{bmatrix}, \quad (7)$$

where, as with other types of BF, the beamformer may be the normalized array response:

$$a_{BF}(Az, El) = \frac{a(Az, El)}{\sqrt{a^H(Az, El)a(Az, El)}}. \quad (8)$$

In some embodiments, additional precision can be gained by similarly taking into account the location of individual antenna elements within the Tx antenna array and/or Rx antenna array.

Some embodiments may use the omnidirectional and directional proximity sensing techniques described herein in conjunction with machine learning algorithms to help ensure robust proximity detection. Machine learning models can be trained using inputs such as an elevation-azimuth response (which may be decimated, in some embodiments, by retaining only maximum values over range taps); SNR, azimuth, elevation, and range of a strongest target in a directional mode FOV; a ratio of power in the directional mode FOV to power outside the directional mode FOV; power distribution in the directional mode FOV; and/or similar features. In experiments, different types of support vector machine (SVM) models were trained on both positives (having an object present) and negatives (without an object), with a cubic SVM model achieving a 99% accuracy, and other SVM model types (linear, quadratic, Gaussian) also achieving high accuracies.

Because leakage can be particularly problematic for short range radar sensing, embodiments may employ any of a variety of leakage cancellation techniques. Leakage adaptation can be used to update and cancel leakage periodically (e.g., once per second, or more) when no object is detected. This can help ensure that leakage is accurately canceled. Other leakage cancellation techniques may employ trigger-based cancellation, based on sensor input or other information indicative of a change in conditions that may change leakage (e.g., a change in temperature, a change of a device cover, etc.). To employ leakage cancellation, a radar system receiver can detect leakage related to a transmission and, after verifying no object is present, use the detected leakage to adapt a leakage cancellation filter to filter out the leakage for subsequent proximity sensing transmissions.

Figure 11:
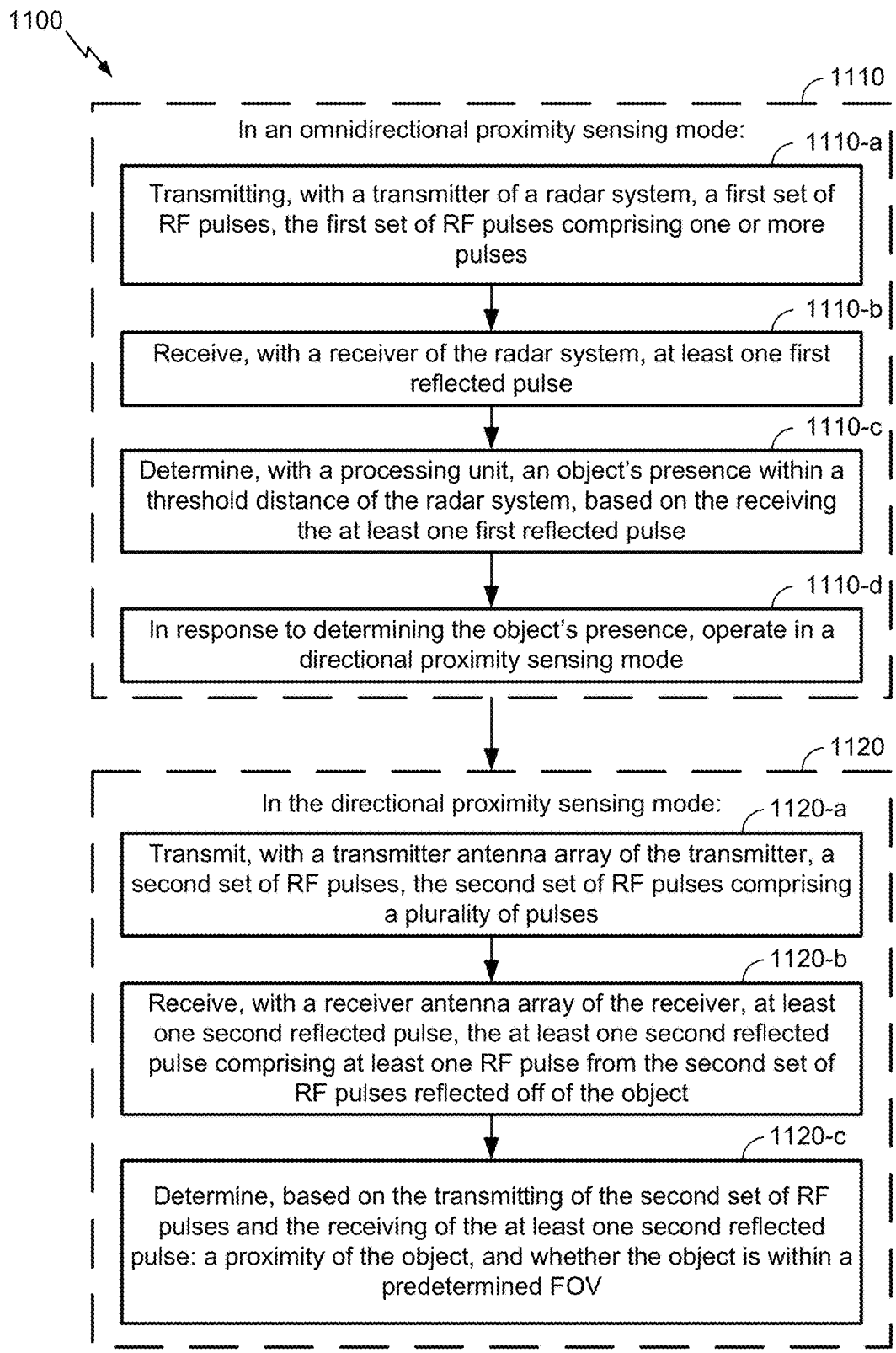
FIG. 11 is a flow diagram of a method of operating a radar system to perform radar proximity detection, according to an embodiment.

FIG. 11 is a flow diagram of a method 1100 of operating a radar system to perform radar proximity detection, according to an embodiment. The method 1100 illustrates aspects of the functionality in the above-described embodiments. One or more of the functions described in the blocks illustrated in FIG. 11 may be performed by software and/or hardware components of a radar system, such as the radar system 105 illustrated in FIG. 1, which may be incorporated into an electronic device, such as the electronic device 1200 illustrated in FIG. 12. Moreover, a person of ordinary skill in the art will appreciate that alternative embodiments may vary in the way they implement the functions illustrated in FIG. 11 by adding, omitting, combining, separating, and otherwise varying the functions illustrated in the blocks of FIG. 11.

At block 1110, the functionality includes operating in an omnidirectional proximity sensing mode by performing the operations illustrated in blocks 1110-*a* to 1110-*d*. The functionality of block 1110-*a* comprises transmitting, with a transmitter a radar system, a first set of RF pulses, where the first set of RF pulses comprises one or more pulses. As previously noted, transmitted RF signals in omnidirectional proximity sensing can include multiple pulses, where the number of pulses can be based on a balance between achieving robust SNR values and maintaining a low power budget. Because sensing is omnidirectional, the pulses may be transmitted by a single transmitter antenna, which may be part of a larger transmitter antenna array. As such, means for performing the functionality at block 1110-*a* may include, for example, a Tx antenna array 135, processing unit 115, and/or other components of a radar system 105.

At block 1110-*b* the functionality comprises receiving, with a receiver of the radar system, at least one first reflected pulse. Similar to the transmitting, this receiving can be done by a single antenna, which may be part of a larger receiver antenna array. As such, means for performing the functionality at block 1110-*b* may include, for example, an Rx antenna array 140, processing unit 115, and/or other components of a radar system 105.

The functionality of block 1110-*c* comprises determining, with a processing unit, an object's presence within a threshold distance of the radar system, based on the receiving and the at least one first reflected pulse. As noted with regard to FIGS. 4 and 5, this determination may be based on whether a CIR exceeds a threshold. As such, in some embodiments of the method 1100, determining the object's presence further comprises determining a CIR from the at least one first reflected pulse. Embodiments may further comprise performing leakage cancellation on the CIR, as noted, and/or determining whether a maximum value of the CIR exceeds a threshold value. Means for performing the functionality at block 1110-*c* may include, for example, a processing unit 115 and/or other components of a radar system 105.

The functionality of block 1110-*d* comprises, in response to determining the object's presence, operating the radar system in a directional mode. This leads to the functionality of block 1120.

At block 1120, the functionality includes operating in a directional proximity sensing mode by performing the operations illustrated in blocks 1120-*a* to 1120-*c*. The functionality of block 1120-*a* comprises transmitting, with a transmitter antenna array of the transmitter, a second set of RF pulses, where the second set of RF pulses comprises a plurality of pulses. Here, in contrast to the functionality at 1110-*a*, directional proximity sensing comprises BF. And thus, multiple antenna elements of an antenna array can be utilized, and multiple pulses can be transmitted. Means for performing the functionality at block 1120-*a* may include, for example, a Tx antenna array 135, processing unit 115, and/or other components of a radar system 105.

At block 1120-*b*, the functionality comprises receiving, with a receiver antenna array of the receiver, at least one second reflected pulse, where the at least one second reflected pulse comprises at least one RF from the second set of RF pulses reflected off of the object. Here again, as part of BF, multiple antenna elements of a receiver antenna array can be used to sense multiple RF pulses. Means for performing the functionality at block 1120-*b* may include, for example, an Rx antenna array 140 and/or other components of a radar system 105.

The functionality of block 1120-*c* comprises determining, based on the transmitting of the second set of RF pulses in the receiving of the at least one second reflected pulse, (1) a proximity of the object, and (2) whether the object is within a predetermined FOV. As previously noted, object detection in the directional proximity sensing mode can be based on proximity (range) and SNR/amplitude within an FOV. As noted with regard to FIG. 9, because angular information can be determined from directional proximity sensing, a more precise range of an object can be determined. Thus, in some embodiments, determining the proximity of the object may comprise accounting for a difference in a location of the transmitter antenna array and a location of the receiver antenna array. SNR-averaged range estimation may additionally or alternatively be used to determine proximity of the object. Thus, according to some embodiments of the method 1100, determining the proximity of the object may comprise determining an SNR averaged range estimation. Means for performing the functionality at block 1120-*c* may include, for example, a processing unit 115 and/or other components of a radar system 105.

As noted, embodiments may also help reduce false positives using side lobe filtering techniques. This can include, for example, comparing a value of an SNR sensed within the predetermined FOV to a mean of values sensed outside the predetermined FOV. The value of the SNR sensed within the predetermined FOV may comprise a maximum or a mean of values within the predetermined FOV.

Some embodiments may employ leakage cancellation when no object is detected. Thus, in some embodiments of the method 1100, the method may further comprise transmitting, with the transmitter of the radar system, a third set of RF pulses, where the third set of RF pulses comprises one or more pulses, measuring, with the receiver of the radar system, a leakage related to the transmitting of the third set of RF pulses, determining, in response to transmitting the third set of RF pulses, that the object is no longer within the threshold distance of the radar system, and adapting a leakage cancellation filter based on the measured leakage related to the transmitting the third set of RF pulses.

Operating a radar system in the manner illustrated in FIG. 11 can further result in providing a proximity detection output in response to determining that the proximity of the object is within a predetermined detection range and the object is within the predetermined FOV. This output may comprise an output to an application, operating system, or hardware layer of an electronic device (e.g., electronic device 205 of FIG. 2). In some embodiments, the proximity detection output may further comprise a location of the detected object (e.g., range and/or location of the detected object relative to a point of reference on the electronic device). Additionally or alternatively, because velocity (Doppler) may be determined from reflected signals in either mode, some embodiments may further comprise providing a velocity of the object, wherein the velocity of the object is determined based on the at least one first reflected pulse in the omnidirectional proximity sensing mode, the at least one second reflected pulse in the directional proximity sensing mode, or both. Moreover, as noted, the predetermined FOV may be configurable. And thus, the radar system may receive an input (e.g., from an application layer or a hardware layer) indicative of an area of interest from which the FOV may be determined.

FIG. 12 is a block diagram of an embodiment of an electronic device 1200, which may incorporate a radar system 105 that can be operated in the manner discussed in the previously-described embodiments. Although some embodiments of an electronic device 1200 may correspond to the particular type of electronic device 205 of FIG. 2 (e.g., a mobile phone), embodiments are not so limited. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different physical or geographical locations. The electronic device 1200 may comprise and/or be integrated into any of a variety of devices, including a mobile phone, tablet, personal computer (PC), laptop, and/or the like.

The electronic device 1200 is shown comprising hardware elements that can be electrically coupled via a bus 1205 (or may otherwise be in communication, as appropriate). The hardware elements may include processing unit(s) 1210, which can include without limitation one or more general-purpose processors, one or more special-purpose processors (such as a DSP, graphics processing unit (GPU), application-specific integrated circuit (ASIC), field-programmable gate array (FPGA), and/or the like), and/or other processing structure, which can be configured to perform one or more of the methods described herein, including the method described in relation to FIG. 11. The electronic device 1200 also can include one or more input devices 1215, which can include without limitation a mouse, a keyboard, a camera, a microphone, a touchscreen, and/or the like; and one or more output devices 1220, which can include without limitation a display device, a speaker, and/or the like.

The electronic device 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including without limitation, various file systems, database structures, and/or the like.

The electronic device 1200 may also include a communications subsystem 1230, which can include support of wireline communication technologies and/or wireless communication technologies (in some embodiments) managed and controlled by a wireless communication interface 1233. The communications subsystem 1230 may include a modem, a network card (wireless or wired), an infrared communication device, a wireless communication device, and/or a chipset, and/or the like. The communications subsystem 1230 may include one or more input and/or output communication interfaces, such as the wireless communication interface 1233, to permit data and signaling to be exchanged with a network, mobile devices, other computer systems, and/or any other electronic devices described herein. As previously noted, a radar system 105 (as illustrated in FIG. 1) may be incorporated into a wireless communications interface 1233 such that antenna elements in a Tx antenna array 135 and Rx antenna array 140, and the circuitry connected with the antenna elements (e.g., the other components of the radar system 105), may be used for both RF imaging and data communication. For example, in some embodiments, the wireless communication interface 1233 may comprise an 802.11ad- and/or 802.11ay-compatible modem capable of both radar-based proximity sensing and data communication.

As noted, some embodiments may have a radar system 105 that is not used for wireless communication. In such instances, the radar system 105 may be incorporated elsewhere within the electronic device 1200. In some embodiments, for example, the radar system 105 may be incorporated into the electronic device 1200 as an input device 1215.

In many embodiments, the electronic device 1200 will further comprise a working memory 1235, which can include a RAM and/or or ROM device. Software elements, shown as being located within the working memory 1235, can include an operating system 1240, device drivers, executable libraries, and/or other code, such as application (s) 1245, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 7 and 10, may be implemented as code and/or instructions that are stored (e.g. temporarily) in working memory 1235 and are executable by a computer (and/or a processing unit within a computer such as processing unit(s) 1210); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as electronic device 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 1200 and/or might take the form of source and/or installable code, which, upon compilation and/or installation on the electronic device 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of operating a radar system to perform radar proximity detection, the method comprising:
   in an omnidirectional proximity sensing mode:
      transmitting, with a transmitter of the radar system, a first set of radio frequency (RF) pulses, the first set of RF pulses comprising one or more pulses;
      receiving, with a receiver of the radar system, at least one first reflected pulse;
      determining, with a processing unit, an object's presence within a threshold distance of the radar system, based on the receiving the at least one first reflected pulse; and
      in response to determining the object's presence, operating in a directional proximity sensing mode; and
   in the directional proximity sensing mode:
      transmitting, with a transmitter antenna array of the transmitter, a second set of RF pulses, the second set of RF pulses comprising a plurality of pulses;
      receiving, with a receiver antenna array of the receiver, at least one second reflected pulse, the at least one second reflected pulse comprising at least one RF pulse from the second set of RF pulses reflected off of the object; and
      determining, based on the transmitting of the second set of RF pulses and the receiving of the at least one second reflected pulse:
         a proximity of the object, and
         whether the object is within a predetermined field of view (FOV), wherein determining whether the object is within the predetermined FOV comprises comparing a value of an SNR sensed within the predetermined FOV to a mean of values sensed outside the predetermined FOV.

2. The method of claim 1, further comprising, in response to determining that the proximity of the object is within a predetermined detection range and the object is within the predetermined FOV, providing a proximity detection output.

3. The method of claim 2, wherein providing the proximity detection output comprises providing a location of the object.

4. The method of claim 3, further comprising providing a velocity of the object, wherein the velocity of the object is determined based on:
   the at least one first reflected pulse in the omnidirectional proximity sensing mode,
   the at least one second reflected pulse in the directional proximity sensing mode, or both.

5. The method of claim 1, wherein determining the object's presence further comprises determining a channel impulse response (CIR) from the at least one first reflected pulse.

6. The method of claim 5, further comprising performing leakage cancelation on the CIR.

7. The method of claim 5, wherein determining the object's presence further comprises determining whether a maximum value of the CIR exceeds a threshold value.

8. The method of claim 1, wherein determining the proximity of the object comprises determining an SNR-averaged range estimation.

9. The method of claim 1, wherein the value of the SNR sensed within the predetermined FOV comprises a maximum or a mean of values within the predetermined FOV.

10. The method of claim 1, wherein determining the proximity of the object comprises accounting for a difference in a location of the transmitter antenna array and a location of the receiver antenna array.

11. The method of claim 1, further comprising:
   transmitting, with the transmitter of the radar system, a third set of RF pulses, the third set of RF pulses comprising one or more pulses;
   measuring, with the receiver of the radar system, a leakage related to the transmitting the third set of RF pulses;
   determining, in response to the transmitting the third set of RF pulses, that the object is no longer within the threshold distance of the radar system; and
   adapting a leakage cancellation filter based on the measured leakage related to the transmitting the third set of RF pulses.

12. A device for performing radar proximity detection, the device comprising:
   a memory; and
   one or more processing units communicatively coupled with the memory and configured to:
   in an omnidirectional proximity sensing mode:
      transmit, with a transmitter of a radar system, a first set of radio frequency (RF) pulses, the first set of RF pulses comprising one or more pulses;
      receive, with a receiver of the radar system, at least one first reflected pulse;

determine an object's presence within a threshold distance of the radar system, based on the receiving the at least one first reflected pulse; and in response to determining the object's presence, operate in a directional proximity sensing mode; and in the directional proximity sensing mode:

transmit, with a transmitter antenna array of the transmitter, a second set of RF pulses, the second set of RF pulses comprising a plurality of pulses;

receive, with a receiver antenna array of the receiver, at least one second reflected pulse, the at least one second reflected pulse comprising at least one RF pulse from the second set of RF pulses reflected off of the object; and determine, based on the transmitting of the second set of RF pulses and the receiving of the at least one second reflected pulse:

a proximity of the object, and whether the object is within a predetermined field of view (FOV)), wherein, to determine whether the object is within a predetermined FOV, the one or more processing units are further configured to compare a value of an SNR sensed within the predetermined FOV to a mean of values sensed outside the predetermined FOV.

13. The device of claim 12, wherein the one or more processing units are further configured to, in response to determining that the proximity of the object is within a predetermined detection range and the object is within the predetermined FOV, provide a proximity detection output.

14. The device of claim 13, wherein, to provide the proximity detection output, the one or more processing units are configured to provide a location of the object.

15. The device of claim 14, wherein the one or more processing units are further configured to provide a velocity of the object after determining the velocity of the object is based on:

the at least one first reflected pulse in the omnidirectional proximity sensing mode, the at least one second reflected pulse in the directional proximity sensing mode, or both.

16. The device of claim 12, wherein, to determine the object's presence, the one or more processing units are further configured to determine a channel impulse response (CIR) from the at least one first reflected pulse.

17. The device of claim 16, wherein the one or more processing units are further configured to perform leakage cancelation on the CIR.

18. The device of claim 16, wherein, to determine the object's presence, the one or more processing units are further configured to determine whether a maximum value of the CIR exceeds a threshold value.

19. The device of claim 12, wherein, to determine the object's presence, the one or more processing units are further configured to determine an SNR-averaged range estimation.

20. The device of claim 12, wherein the value of the SNR sensed within the predetermined FOV comprises a maximum or a mean of values within the predetermined FOV.

21. The device of claim 12, wherein, to determine the proximity of the object, the one or more processing units are further configured to account for a difference in a location of the transmitter antenna array and a location of the receiver antenna array.

22. The device of claim 12, wherein the one or more processing units are further configured to:

transmit, with the transmitter of the radar system, a third set of RF pulses, the third set of RF pulses comprising one or more pulses;

measure, with the receiver of the radar system, a leakage related to the transmitting the third set of RF pulses;

determine, in response to the transmitting the third set of RF pulses, that the object is no longer within the threshold distance of the radar system; and adapt a leakage cancellation filter based on the measured leakage related to the transmitting the third set of RF pulses.

23. A device comprising:

means for transmitting, in an omnidirectional proximity sensing mode, a first set of radio frequency (RF) pulses, the first set of RF pulses comprising one or more pulses;

means for receiving, in the omnidirectional proximity sensing mode, at least one first reflected pulse;

means for determining, in the omnidirectional proximity sensing mode, an object's presence within a threshold distance of the device, based on the receiving the at least one first reflected pulse;

means for operating in a directional proximity sensing mode in response to determining the object's presence;

means for transmitting, in the directional proximity sensing mode, a second set of RF pulses, the second set of RF pulses comprising a plurality of pulses;

means for receiving, in the directional proximity sensing mode, at least one second reflected pulse, the at least one second reflected pulse comprising at least one RF pulse from the second set of RF pulses reflected off of the object; and means for determining, based on the transmitting of the second set of RF pulses and the receiving of the at least one second reflected pulse:

a proximity of the object, and whether the object is within a predetermined field of view (FOV), wherein the means for determining whether the object is within a predetermined FOV comprise means for comparing a value of an SNR sensed within the predetermined FOV to a mean of values sensed outside the predetermined FOV.

24. The device of claim 23, further comprising means for providing a proximity detection output in response to determining that the proximity of the object is within a predetermined detection range and the object is within the predetermined FOV.

25. The device of claim 23, wherein the means for determining the proximity of the object comprise means for determining an SNR-averaged range estimation.

26. The device of claim 23, further comprising:

means for transmitting a third set of RF pulses, the third set of RF pulses comprising one or more pulses;

means for measuring a leakage related to the transmitting the third set of RF pulses;

means for determining, in response to the transmitting the third set of RF pulses, that the object is no longer within the threshold distance of the device; and means for adapting a leakage cancellation filter based on the measured leakage related to the transmitting the third set of RF pulses.

27. A non-transitory computer-readable medium having instructions embedded therewith for operating a radar system to perform radar proximity detection, wherein the instructions, when executed by one or more processing units, cause the one or more processing units to:

in an omnidirectional proximity sensing mode:

transmit, with a transmitter of the radar system, a first set of radio frequency (RF) pulses, the first set of RF pulses comprising one or more pulses;

receive, with a receiver of the radar system, at least one first reflected pulse;

determine an object's presence within a threshold distance of the radar system, based on the receiving the at least one first reflected pulse; and in response to determining the object's presence, operate in a directional proximity sensing mode; and in the directional proximity sensing mode:

transmit, with a transmitter antenna array of the transmitter, a second set of RF pulses, the second set of RF pulses comprising a plurality of pulses;

receive, with a receiver antenna array of the receiver, at least one second reflected pulse, the at least one second reflected pulse comprising at least one RF pulse from the second set of RF pulses reflected off of the object; and determine, based on the transmitting of the second set of RF pulses and the receiving of the at least one second reflected pulse:

a proximity of the object, and whether the object is within a predetermined field of view (FOV), wherein determining whether the object is within the predetermined FOV comprises comparing a value of an SNR sensed within the predetermined FOV to a mean of values sensed outside the predetermined FOV.

* * * * *